(No Model.)
G. ZEILSTRA.
WAGON NUT.
No. 575,751. Patented Jan. 26, 1897.
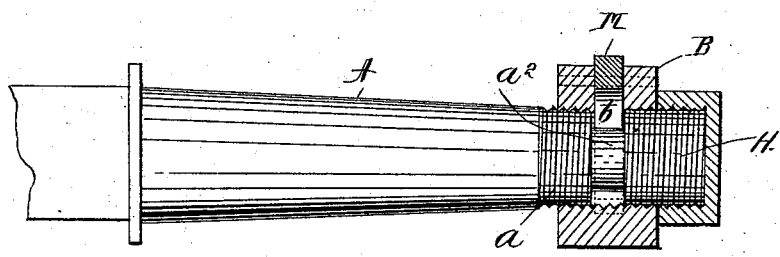
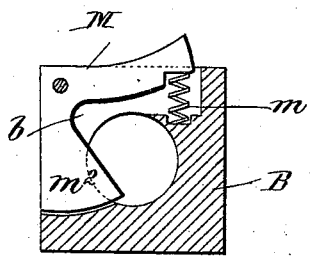
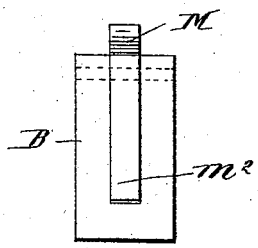
WITNESSES
John Buckler
A. M. Cusack
INVENTOR
Gerhard Zeilstra,
BY
Edgar Tate & Co
ATTORNEYS.

UNITED STATES PATENT OFFICE.

GERHARD ZEILSTRA, OF GRAND RAPIDS, MICHIGAN, ASSIGNOR OF ONE-HALF TO A. V. SCHENCK, OF SAME PLACE.

WAGON-NUT.

SPECIFICATION forming part of Letters Patent No. 575,751, dated January 26, 1897.

Application filed February 5, 1896. Serial No. 578,078. (No model.)

*To all whom it may concern:*

Be it known that I, GERHARD ZEILSTRA, a citizen of the United States, and a resident of Grand Rapids, in the county of Kent and State of Michigan, have invented certain new and useful Improvements in Wagon-Nuts, of which the following is a specification, reference being had to the accompanying drawings, forming a part thereof, in which similar letters of reference indicate corresponding parts.

This invention relates to nut-locks for the spindles of carriages and other vehicles; and the object thereof is to provide a simple and effective device of this class which is easily operated and simple in construction and which may be employed in almost any position wherein nut-locks may be applied.

The invention is fully disclosed in the following specification, in which the accompanying drawings form a part.

Figure 1 is a side view of the end of a spindle of a carriage or similar vehicle, showing my improved nut-lock in section. Fig. 2 is a transverse section thereof, and Fig. 3 is a side view of the nut detached from the spindle.

In the drawings forming part of this specification the letter A represents the spindle of an axle of a carriage or other vehicle, the end of which is screw-threaded, as shown at $a$, and the screw-threaded portion thereof is provided with an annular groove $a^2$, and in the practice of my invention I provide a nut B, in which is formed a transverse slot in two sides thereof, as shown at $b$, and in said slot is pivoted a lever M, one end of which is supported by a spring $m$, mounted in one end of said slot, and the other arm of said lever is provided with a head $m^2$, which is adapted to be forced by said spring in the annular groove $a^2$ in the screw-threaded end of the spindle, and the operation of this form of construction will be apparent.

In securing the nut in position upon the end of the spindle or rod it is only necessary to place the nut thereon and depress the spring-actuated end of the lever M until the nut has been screwed in its proper position, after which the lever may be released, and the head $m^2$ thereof will be forced into the annular groove $a^2$ on the screw-threaded end of the spindle or rod, thus locking the nut in position thereon.

It will be apparent that my improved nut-lock may be applied to bolts, rods, or other similar articles wherever it is desired to secure the nuts thereon and prevent the rotation thereof, and it is evident that changes in and modifications of the construction herein described may be made without departing from the spirit or scope of my invention or sacrificing its advantages.

Having fully described my invention, what I claim, and desire to secure by Letters Patent, is—

A spindle or bolt provided with a screw-threaded portion in which is formed an annular groove, and the nut provided with a screw-threaded bore adapted to be secured upon said screw-threaded portion of the spindle or bolt, said nut having a slot in which is mounted a spring-actuated bell-crank lever, the free end of which is flared or enlarged and it is adapted to engage the annular groove in the end of the spindle or bolt, to securely lock the bolt in position thereon, substantially as described.

In testimony that I claim the foregoing as my invention I have signed my name, in presence of the subscribing witnesses, this 8th day of January, 1896.

GERHARD ZEILSTRA.

Witnesses:
 FRANCIS VAN LEEUWEN,
 G. W. SEGOR.